United States Patent
Utagawa

(10) Patent No.: US 8,194,758 B2
(45) Date of Patent: Jun. 5, 2012

(54) IMAGE RECEIVING APPARATUS AND CONTROL METHOD OF IMAGE RECEIVING APPARATUS

(75) Inventor: Yuka Utagawa, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 996 days.

(21) Appl. No.: 12/139,747

(22) Filed: Jun. 16, 2008

(65) Prior Publication Data

US 2008/0309825 A1 Dec. 18, 2008

(30) Foreign Application Priority Data

Jun. 18, 2007 (JP) ................. 2007-160222

(51) Int. Cl.
*H04B 1/66* (2006.01)
*H04N 7/12* (2006.01)
*H04N 11/02* (2006.01)
*H04N 11/04* (2006.01)

(52) U.S. Cl. ......... 375/240.27; 375/240.16; 375/240.21; 375/240.26; 386/353; 386/355; 386/356

(58) Field of Classification Search .......... 375/240–241; 348/725; 382/232, 260; 358/426.01, 426.16; 386/353, 355, 356
See application file for complete search history.

(56) References Cited

U.S. PATENT DOCUMENTS

| 7,027,782 | B2 * | 4/2006 | Moon et al. ............... 455/102 |
| 7,254,765 | B2 * | 8/2007 | Meyer et al. ............... 714/748 |
| 7,546,508 | B2 * | 6/2009 | Greer ....................... 714/748 |
| 2003/0014705 | A1 * | 1/2003 | Suzuki et al. ............. 714/748 |
| 2006/0117371 | A1 * | 6/2006 | Margulis ................... 725/131 |
| 2006/0291468 | A1 * | 12/2006 | Bopardikar et al. ........ 370/392 |
| 2008/0309825 | A1 * | 12/2008 | Utagawa .................... 348/725 |

FOREIGN PATENT DOCUMENTS

JP 11-331839 A 11/1999

* cited by examiner

*Primary Examiner* — Kwang B Yao
*Assistant Examiner* — Benjamin H Elliott, IV
(74) *Attorney, Agent, or Firm* — Canon U.S.A., Inc. IP Division

(57) ABSTRACT

A video receiving apparatus configured to receive packetized video data from a server includes a detecting unit configured to detect an error from the packetized video data received from the server; a determining unit configured to determine the importance of the packetized video data with the error in the case that the error is detected by the detecting unit, based on added information relating to the packetized video data; and an error processing unit configured to process the packetized video data with the error, according to the importance determined by the determining unit.

9 Claims, 6 Drawing Sheets

NUMBER OF TIMES OF PROPAGATION OF ERROR

|  | Pack1 | Pack2 | Pack3 | Pack4 | Pack5 | Pack6 |
|---|---|---|---|---|---|---|
| NUMBER OF ERROR PROPAGATION | 5 | 4 | 3 | 2 | 1 | 5 |
| ENCODING MODE | 5 (I) | 3 (P) | 3 (P) | 3 (P) | 3 (P) | 5 (I) |
| AMOUNT OF CHANGE | 4 | 2 | 1 | 1 | 2 | 4 |
| TOTAL | 14 | 9 | 7 | 6 | 6 | 14 |

IMAGE RECEIVING APPARATUS AND CONTROL METHOD OF IMAGE RECEIVING APPARATUS

BACKGROUND OF THE INVENTION

1. Field of the Invention

The present invention relates to an image receiving apparatus, and a control method, program, and recording medium for an image receiving apparatus, and in particular relates to techniques to be used when data is omitted in sending images over a network.

2. Description of the Related Art

In recent years, the Internet has become widely used, and information is frequently communicated via a network. Thus, various forms of information such as text, image, and audio can be exchanged, and moving images are also a type which can be exchanged via a network. Therefore, not only video recorded beforehand, but video taken in live coverage and for monitoring purposes can also be exchanged. As a result, demand for exchanging video, and immediately transmitting video taken in live coverage, or for monitoring, to the side receiving the information so as to reproduce the image, has been increasing.

Normally, communication protocols such as TCP (Transmission Control Protocol) and UDP (User Datagram Protocol) are used for Internet communication. TCP assures correct data transmission, so communication can be made with high reliability. However, a large transmission bandwidth is used to open a connection, and also erroneous data is subjected to a retransmission processing, so a delay may occur in the transmission of data.

On the other hand, UDP does not necessarily assure a highly reliable communication function, and error and omissions of the data may occur, thereby lowering reliability. However, since there is no need to open or close a connection, the transmission process can be performed at a high speed. A moving image is continuous data of a large size, so in the case of reproduction in real-time, transmitting at a high speed is necessary. Accordingly, in the case of transmitting a moving image with the Internet, UDP is often used because of its high transmission speed.

In the case of reproducing video data in the same time as the time that the video data is generated, erroneous data is retransmitted, whereby the video frame rate is lowered. Thus, for example, Japanese Patent Laid-Open No. 11-331839 discloses a video transmission/retransmission apparatus to perform data transmission without requiring retransmission of all data, and avoiding omission of important information. The video transmission/retransmission apparatus described in Japanese Patent Laid-Open No. 11-331839 computes the importance of data to be transmitted, based on (1) through (4) below, and performs a retransmission request for data with high importance.

(1) Positional information of which position on a screen the data will be displayed at time of reproduction.

(2) Degree of change within a frame which is one frame before the frame during transmission processing, of whether there is any change to the video data at the same position as the transmitting video data.

(3) Correlation of a scene of whether there is any change to the video scene of the entire frame by comparing the frame during transmission processing with one frame preceding.

(4) In the case that a transmitter reads multiple different video and transmits the video data, correlation of whether each video has great movement as a video, is relatively compared.

For example, in the case that an error location in a frame including an error is far away from the center of the frame, or the amount of change thereof is small in comparison with the preceding frame, this frame is not subject to a retransmission request. Also, in the case where the amount of change in a video scene of an entire frame is small, this frame is not subjected to a retransmission request.

However, the video transmission/retransmission apparatus described in Japanese Patent Laid-Open No. 11-331839 can only perform a retransmission request as an error handling process of an error frame. In addition, at the server side, an entire frame determined to have an error is transmitted in accordance with the retransmission request, so the processing load becomes large. Particularly, in the case that one server manages multiple clients, the processing load for retransmission data becomes extremely large. Therefore, the problem with the increase in traffic from retransmission has not been sufficiently prevented.

Thus, in order to prevent an increase in traffic from retransmission, the importance threshold is increased to reduce the frames subjected to retransmission request. However, the frames without a retransmission request cannot be handled, so there has been a problem in that omission of important information cannot be sufficiently avoided.

SUMMARY OF THE INVENTION

The present invention has been made with consideration for the above-described problems, and provides for enabling, in a case that an error occurs in video data, avoiding important information from being omitted, while suppressing the traffic increase due to retransmission of data to a minimum.

A video receiving apparatus according to one aspect of the present invention is configured to receive packetized video data from a server, and includes an error detecting unit configured to detect an error from the packetized video data received from the server; an importance determining unit configured to determine the importance of the packetized video data with the error in the case that the error is detected by the error detecting unit, based on added information relating to the packetized video data; and an error processing unit configured to process the packet with the error, according to the importance determined by the importance determining unit.

A control method of the video receiving apparatus according to the present invention is arranged to receive packetized video data from a server, the method including an error detecting process arranged to detect an error from the packetized video data received from the server; an importance determining process arranged to determine the importance of the packetized video data with the error in the case that an error is detected by the error detecting process, based on added information relating to the video data; and an error processing process arranged to process as to the packetized video data with the error, according to the importance determined in the importance determining process.

A program according to an aspect of the present invention is a computer-executable program stored in a computer-readable medium that causes a computer to execute receiving of packetized video data from a server, the program including detecting an error from the packetized video data received from the server; determining the importance of the packetized video data with the error in the case that the error is detected, based on added information relating to the packetized video data; processing the packetized with the error, according to the importance.

A recording medium according to an aspect of the present invention has recorded therein the program described above.

According to the present invention, the importance of a portion with an error occurring is determined based on added information relating to video data, and error handling processing is performed according to the importance of the packetized video data with the error. Thus, in a case that an error has occurred in the video data, the number of frames subjected to retransmission requests can be minimized. Accordingly, omissions of important information can be avoided while suppressing an increase of traffic from the data retransmission to a minimum, whereby visually detectable image quality deterioration can be kept to a minimum.

Further features and aspects of the present invention will become apparent from the following description of exemplary embodiments (with reference to the attached drawings).

BRIEF DESCRIPTION OF THE DRAWINGS

The accompanying drawings, which are incorporated herein and constitute a part of the specification, illustrate embodiments of the invention and, together with the description, serve to explain the principles of the invention.

DESCRIPTION OF THE EMBODIMENTS

First Embodiment

Figure 2:
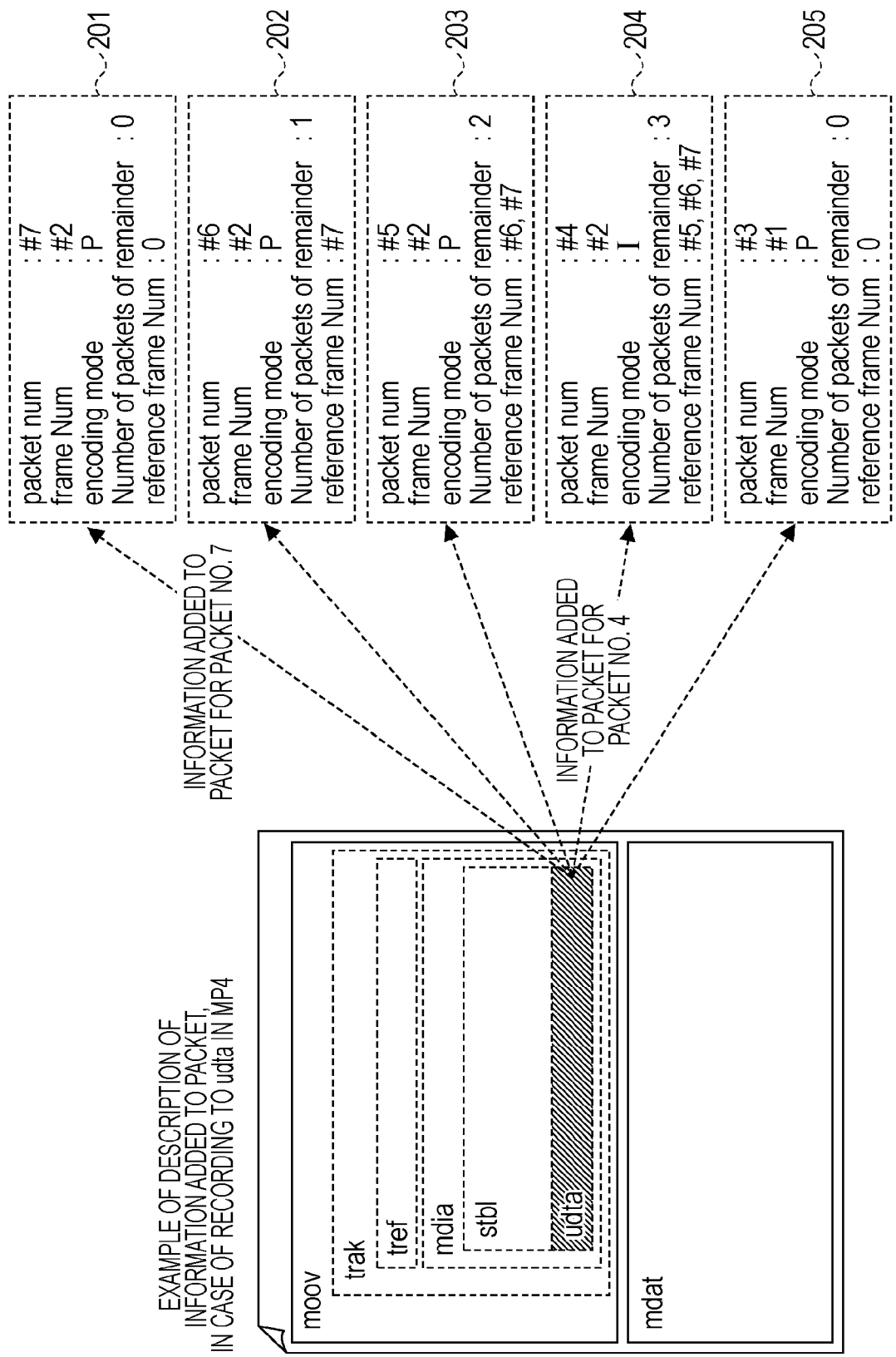
FIG. 2 is a diagram illustrating a written example of information added to packet according to the first embodiment of the present invention.

An embodiment of the present invention will be described below with reference to the appended diagrams. With the present embodiment, an example of the file format, ISO Base Media File Format (mp4), will be described. Also, with the present embodiment, an example will be described wherein various types of parameters for determining importance are recorded in a User Data Box ('udta') in an MP4 file, as shown in FIG. 2.

Figure 1:
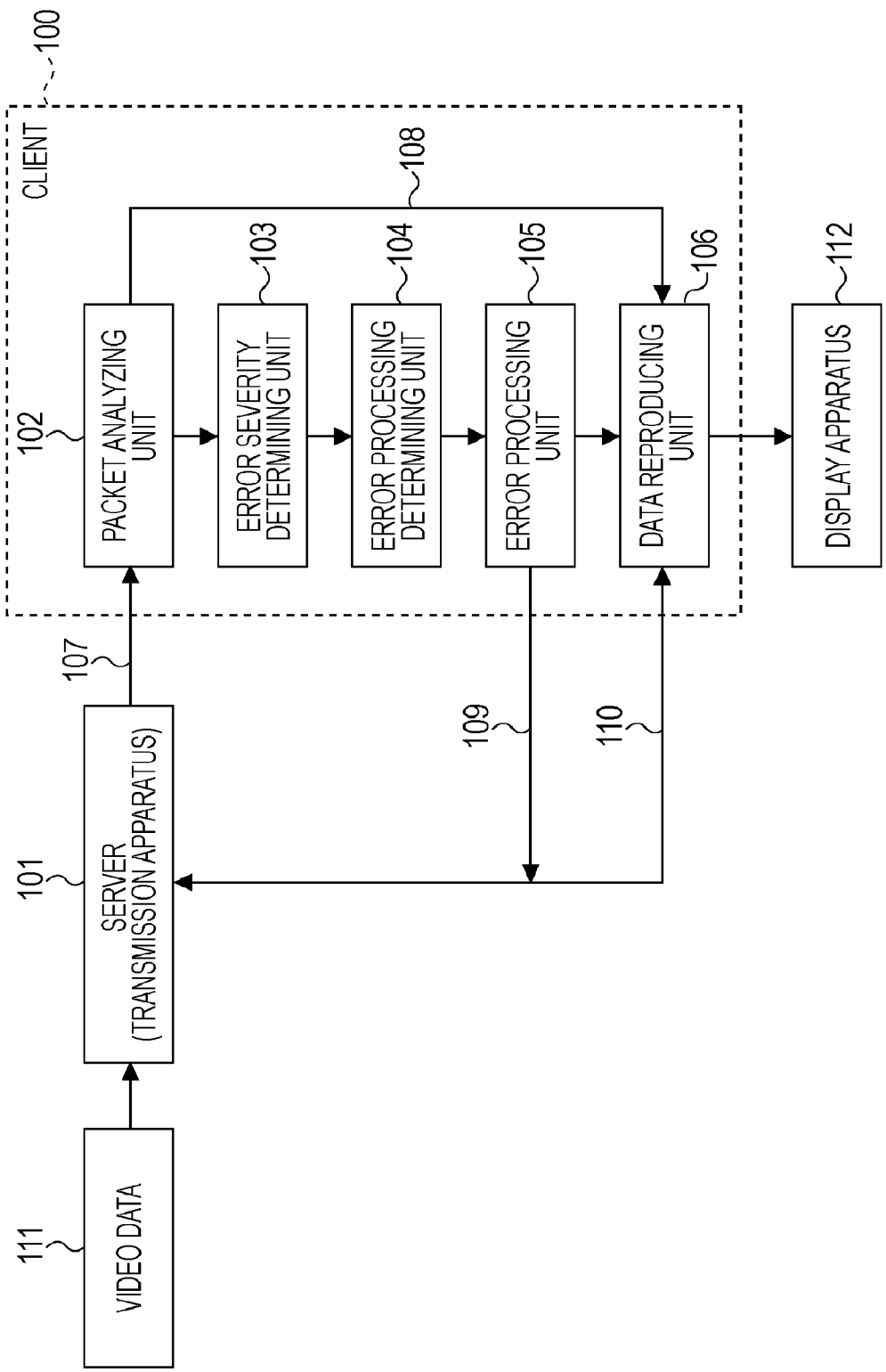
FIG. 1 is a block diagram illustrating an exemplary functional configuration of the image receiving apparatus according to a first embodiment of the present invention.

FIG. 1 is a block diagram showing an exemplary functional configuration of a video receiving apparatus of the present embodiment.

As shown in FIG. 1, a client (video receiving apparatus) 100 relating to the present embodiment has a packet analyzing unit 102 to test errors or omissions of received packets, and an error severity determining unit 103 to determine the importance of a packet including an error or omitted data. Also, the client 100 has an error processing determining unit 104 to determine error processing based on the severity determined with the error severity determining unit 103. Further, the client 100 has an error processing unit 105 to perform error processing (includes instruction for error processing) as to the packet based on the determining result with the error processing determining unit 104, and a data reproducing unit 106 to reproduce the received video data.

Next, the video data 111 and packet used with the present embodiment will be described. With the present embodiment, an arrangement such as DV (Digital Video) or JPEG method is used for the video data that is configured for each frame. Also, the packet used with the present embodiment has information such as packet number, number of frame to be transmitted, code amount, and frame number to be referenced, as header information. The information recorded in the header is not limited to the above examples, and information other than the above examples may be included.

First, in the case that an error occurs in the video data is sent from the server (transmitter) 101, an error packet is detected. The error processing sequence will be described with reference to the flowchart in FIG. 7.

First, the packet analyzing unit 102 functions as an error detecting unit when packetized video data is sent from the server 101 to the client 100 (107 in FIG. 1). The packet analyzing unit 102 determines whether an error has occurred in the video data 111 sent from the server 101 (step S701). As a result of this determination, in the case that an error has occurred (YES in step S701), the packet analyzing unit 102 detects an error packet (step S702). The detected error packet is notified to the error severity determining unit 103, and is notified to the data reproduction unit 106 (108). The error severity determining unit 103 determines the importance of the error packet based on the information relating to a packet itself or before or after (step S703).

Next, the error processing determining unit 104 determines an error processing method based on the importance of the packet with error determined in step S703 (step S704). Based on the error processing method determined in the error processing determining unit 104, the error processing unit 105 performs error processing (instructions necessary for error processing) (step S705). At this time, in a case of performing a retransmission request and so forth, instructions are given to the server 101 (109). The server 101 outputs data necessary for error processing to the data reproducing unit 106, corresponding to instructions from the error processing unit 105 (110). The data reproducing unit 106 uses the data sent from the server 101 and performs error processing. The data subjected to error processing is finally displayed on a display apparatus 112 with the data reproducing unit 106 (step S706). On the other hand, as a result of the determining in step S701, in the case that an error has not occurred (NO in the step S701), the flow advances to step S706.

FIG. 2 is a diagram showing a descriptive example of packet importance determining elements included in the information added to packet recorded in the "udta" (User Data Box) of the MP4 file. Note that FIG. 2 shows five packets of information added to packet 201 through 205.

This will be described in detail with the information added to packet 201 and 202 as examples. Here, "packet Num" denotes a packet number, "#7" of the information added to packet 201 denotes the seventh packet, "#6" of the information added to packet 202 denotes the sixth packet, "frame Num" denotes the number of a frame group such packet configures, and with the information added to packet 201 and 202, the frame group number is shown to be packet "#2", and "encoding mode" denotes the encoding mode of a packet, and shows with the information added to packet 201 and 202 that this is a P frame.

"Number of packets of remainder" shows how many frames (packets) the packet itself is referenced to by among the frames (packets) referencing the same I frame. That is to say, in the case of a packet wherein the information added to packet 201 is added, the number of packets referencing itself is zero, and in the case that the information added to packet 202 is added, the number of packets referencing itself is one.

The "reference frame Num" shows specifically which packet the self packet is referenced by. In the case of a packet to which information added to packet 201 is added, there are no referencing packets, so "0" is shown, and in the case of a packet to which information added to packet 202 is added, the seventh packet is referenced, so "#7" is shown. Also, regarding a packet (I frame) to which information added to packet 204 has been added, the frames (packets) referencing this I frame exist between the frame and the next I frame, so "#5, #6, #7" is shown.

The error severity determining unit 103 determines the importance of a packet as to each parameter based on threshold information, as to each parameter. Note that with the present embodiment, a description method of a packet importance determining element is shown with ISO Base Media File Format as an example, but file format and the description items and description method of the packet importance determining element are not limited to these.

Figures 3, 4:
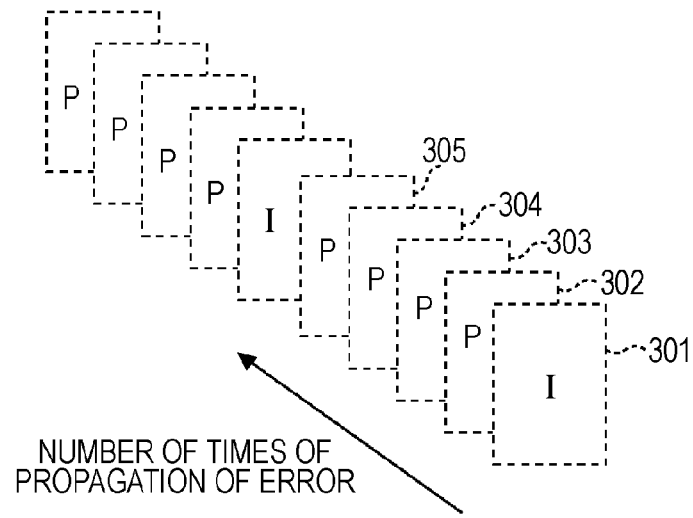
FIG. 3 is a diagram illustrating a frame (packet) configuring video data.
FIG. 4 is a diagram illustrating an example of a numerical value menu of an importance determining element for each packet according to a third embodiment of the present invention.

Next, a specific packet importance determining method will be described with reference to FIG. 3. FIG. 3 is a diagram visually showing a frame configuring the data. With the present embodiment, the type of encoding has the order of I-frame, P-frame, B-frame in the order of highest importance to lowest importance. P-frames or B-frames are decoded with reference to the immediately-previous I-frame or the next I-frame, whereby any error occurring with the I-frame is propagated to P-frames or B-frames. Therefore, the I-frame has a high importance setting.

With the P-frame also, the frame following this frame also is influenced by the error, but the number of frames that the error propagates is less than the I-frame when compared to the case of an I-frame. Therefore, a P-frame has a lower importance setting than the I-frame.

For example, with FIG. 3, in the case of focusing on I-frame 301 and the following P-frames 302 through 305, an error occurring in I-frame 301 is propagated to all of the P-frames 302 through 305, so the error propagating distance is great. Also, with the P-frames 302 through 304, there is a following frame which references the preceding frame, so an error occurring in the preceding frame is propagated to the following frame. For example, an error occurring in P-frame 302 is propagated to P-frames 303 through 305, an error occurring in P-frame 303 is propagated to P-frames 304 and 305, and an error occurring in P-frame 304 is propagated to P-frame 305. However, compared to the I-frame 301, the error propagating distance is small.

The error propagating distance (number of error propagation) shows the number of frames influenced by the error occurring in the current frame. With the present embodiment, the higher the number of frames influenced by the error (the error occurring in the frame propagates), the higher the packet importance setting is made. In the event of counting error propagating distance, e.g. as shown in FIG. 2, the frame number referenced by itself is recorded for each frame. In such a case, the greater the number of frames referenced by from other frames, the greater is the error propagating distance, so the importance thereof is higher.

Also, as another method, there is a method to set the importance based on the distance from the referencing I-frame, within the frame group referencing the same I-frame. In the case of an I-frame, all of the frames until the next I-frame are referenced, so the error propagating distance becomes great. Also, in the case of a P-frame (B-frame), the number of frames referencing this frame becomes greater the closer to the I-frame, but the number thereof is smaller than the case of an I-frame. Therefore, in the case of a P-frame (B-frame), the importance is lower than in the case of an I-frame.

Thus, with the present embodiment, by determining importance based on the error propagating distance recorded in the packet information, e.g. in a case that data is omitted during communication or the like, error processing based on the importance thereof can be performed. Thus, visually detectable image quality deterioration at the time of video reproduction can be avoided.

Next, description will be made regarding a method for obtaining, in the event that a packet is received, information added to the packet relating to the received video data, determining the importance of the packet wherein the error has occurred based on the information added to the packet, and further determining an error processing method.

As described above, an error is detected with the packet analyzing unit 102 (including packet loss), and based on the results of the determination with the error severity determining unit 103, the error processing determining unit 104 decides the error processing as to the error packet.

For example, in the case that the error packet importance is highest which is determined based on a set threshold, a retransmission request is sent to such packet. This is because the error of the packet influences the following packet greatly. Thus, in the case of a packet to configure one frame, the importance of such packet is increase so as to always give a retransmission request.

Thus, a retransmission request is performed relating to a packet having great error propagating distance and high importance, but in the case there is a restriction to circuit capacity, if a retransmission request is performed to all of the error packets, another error may occur during retransmission of an important packet. Thus, by only performing retransmission processing relating to a packet with the highest importance, omission of an important packet can be prevented. However, if retransmission processing is performed only for packets with high importance, and no processing is performed for other error packets, the visually detectable error may increase. Thus, with the present embodiment, processing is changed according to the error packet.

For example, as shown in FIG. 3, although not a packet configuring an I-frame, in the case of a packet (P-frame 302 shown in FIG. 3) with a great error propagating distance, Error Concealment is performed. In the case of a P-frame 302, the importance thereof is not as high as compared to the I-frame 301, but the error occurring in the P-frame 302 is propagated to the P-frames 303 through 305. That is to say, the frame has a great error propagating distance, so the probability that the error occurring in the P-frame 302 will have a visually detectable image quality deterioration is high. Hence, the negative influence on the reproduction image quality is great.

Conversely, an error occurring in the P-frame 305 is not propagated to any other frame. That is to say, the error propagating distance is 0. Thus, since the load from error processing is light, a packet configuring a frame with a small error propagating distance such as the P-frame 305 does not have the frame thereof displayed. Note that if there is additional processing functionality or communication capacity on the side performing the error processing, error processing such as error concealment can be performed.

With the present embodiment, a retransmission request, error concealment, and non-display of a frame are described as examples of error processing of an error packet, but it goes without saying that error processing is not limited to the above processing methods.

Thus with the present embodiment, the importance of the packet wherein an error has occurred is determined based on the error propagating distance, and error handling processing according to the importance thereof is performed as to a packet including a portion with an error. Thus, in the case that an error occurs in a packet, a retransmission request is performed with the I-frame which has high importance, and with the other P-frames and so forth, error handling processing such as error concealment or non-display is performed, thus reducing the number of frames for retransmission request. Accordingly, the increase of traffic from the retransmission of data is minimized, so omission of important information which leads to visually detectable image quality deterioration can be sufficiently avoided.

Second Embodiment

Figure 6:
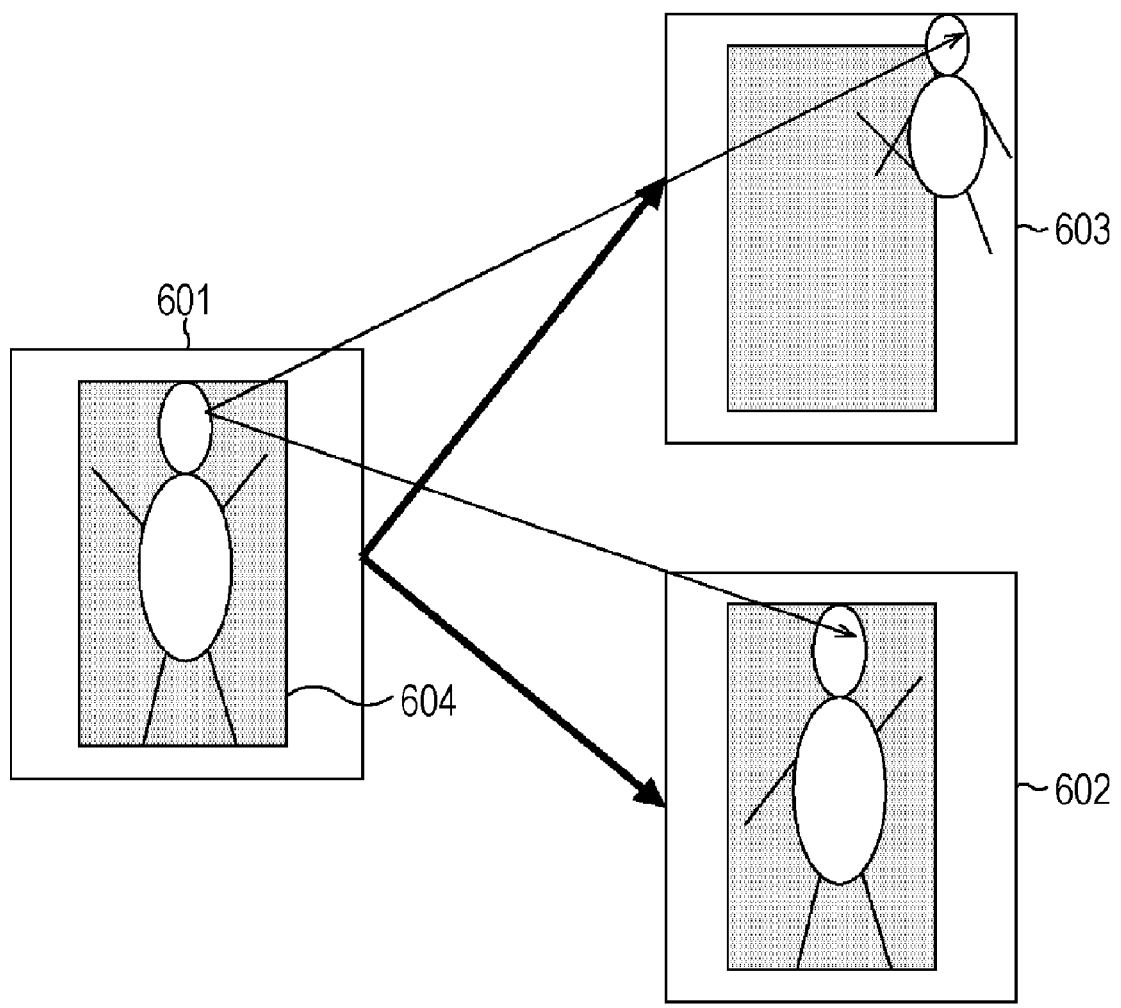
FIG. 6 is a diagram illustrating the amount of change between frames.

With the present embodiment, an example to determine importance and error processing from motion vector information between frames, code amount, and so forth will be described with reference to FIG. 6. FIG. 6 illustrates the amount of change between frames.

FIG. 6 focuses on the amount of change between an original frame 601 and the next frame. For example, giving consideration to an area 604 within the original frame 601, the amount of change in the case of the frame 602 is small, and the amount of change in the case of the frame 603 is large. There are various determining standards for amount of change, but as shown in FIG. 6, the amount of change relating to a given region may be used, or an amount of change of a motion vector based on the amount of movement at a certain point may be used. Methods to find the amount of change are not limited to these examples.

With the present embodiment, the amount of change between frames as a determining element (item) for importance is considered, and the greater the amount of change is for a frame, the higher the importance of the frame is set. That is to say, if a packet with an error is detected, the error severity determining unit 103 obtains the motion vector information of a preceding packet. Based on the obtained information, in the case the motion vector is large, the importance of such packet is set high, and in the case the motion vector is small, the importance thereof is set low.

This is because an error occurring in a frame with a large change can greatly influence visually detectable image quality by this error. If an error occurs in a frame having a small amount of change from the previous frame, such portion is omitted, since the amount of change from the previous frame is small, a block of the previous frame can be compensated. Thus, a frame with a small amount of change from the previous frame is set to low importance.

As an obtaining method for motion vector information used as an importance determining element with the present embodiment, this may be computed from packet information on the receiver side, or an arrangement may be made wherein the transmitter side obtains motion vector information and sends this to the receiver side. An obtaining method for motion vector information is not limited to the above examples.

Also, an arrangement may be made to a change amount relating to an important point within the frame is recorded, and a frame including many points with a large change amount is set with high importance. Thus, the chance of omitting points of high importance, which causes visually detectable image quality deterioration, can be prevented.

Also, along with the change amount of previous frame, code amount is also a packet importance determining element. The packet analyzing unit 102 can determine the importance based on the obtained packet code amount which references threshold information. In this case, the locations of the packet with a higher code amount than the threshold has greater motion, therefore, the importance is set high; the locations with a lower code amount than the threshold has less motion, therefore, the importance is set low.

Thus, with the packet importance determining element, the importance is set based on threshold information to determine importance which is set beforehand, so error processing can be performed according to the importance thereof. With error processing, as with the first embodiment, a retransmission request is sent for those with a high importance, and error concealment is performed for those with not so high importance. Also, in the case where there is almost no influence given to the following frames by the error occurring in the current frame, the current frame is not displayed. Thus, traffic increase from data retransmission can be suppressed to a minimum, and omissions of important information can be sufficiently avoided. Note that similar to the first embodiment, the error processing based on importance is not limited to that which is described in the present embodiment.

Third Embodiment

With the above-described second embodiment, description is given wherein the importance is determined for each packet importance determining element, and based on this the error handling at the time of error occurring is determined. With the present embodiment, an example to determine the packet importance will be described to convert the importance of each packet importance determining element, which is added information relating to the video data, into numerical values, based on the value computed from multiple packet importance determining elements.

FIG. 4 is a diagram illustrating an example of showing each packet importance as the packet importance determining element and change amount shown in FIG. 2 with a numerical value. The present embodiment will be described, with error propagating distance, coding mode, and change amount from the previous frame as examples. Also, with the present embodiment, an importance evaluating method for each parameter importance determining element is performed in five stages, but should not be limited to these stages. Also, with the importance determining element shown in FIG. 5, not all need to be included, and also importance determining elements other than those shown may be used. Also, packet information other than the importance determining element shown in the previous embodiment may be recorded.

To describe each importance determining element, the error propagating distance, as described above, shows the number of frames the error occurring in the frame influences, and the frame with the greater error propagating distance has a higher importance set. A coding mode sets the importance of the I-frame higher, and the P-frame (and B-frame) has a lower importance setting than the I-frame. Note that with the example shown in FIG. 4, in the case of an I-frame the importance is set as "5" and in the case of the P-frame the importance is set as "3". Also, with the change amount from the previous frame, the greater the change amount is, the higher the importance is set because of the large visual influence from the error occurring at such location.

In the case that results such as shown in FIG. 4 are obtained with such a method, the importance of each packet importance determining element are added together, and those with a higher numerical value is determined to be a packet with higher importance. With the example shown in FIG. 4, the importance of "Pack 1" and "Pack 6" having a total of "14" has the highest importance. Thus by expressing importance with a numerical value, determination of importance can be readily performed, with consideration of multiple packet importance determining elements, so omission of important information can be avoided.

Also, with the example shown in FIG. 4, the importance of each importance determining elements are added to make determination, but in the case of determining importance by using multiple elements, not only simply adding together all of the elements is necessary, but may be used differently according to conditions. For example, regardless of other conditions, in the case that the coding mode is an I-frame, the importance is set high. In the case that the coding mode is P-frame or B-frame, an importance is set based on a combined element wherein, in addition to the coding mode, the error propagating distance and the change amount from the previous frame are both used.

Thus with the present embodiment, multiple importance determining elements are combined according to conditions, so a flexible importance determining according to circuit situation, and error processing based thereupon, can be performed.

Fourth Embodiment

With the above-described first embodiment, importance is attached to each packet based on the error propagating distance obtained from the information added to packet, and based thereupon, the error processing determining unit 104 determines error processing for the packet with an error. Conversely, with the present embodiment, an example will be described to perform error packet detecting, importance determining of an error packet, and error processing based on importance, based on a reference map sent beforehand from the server.

Figure 5:
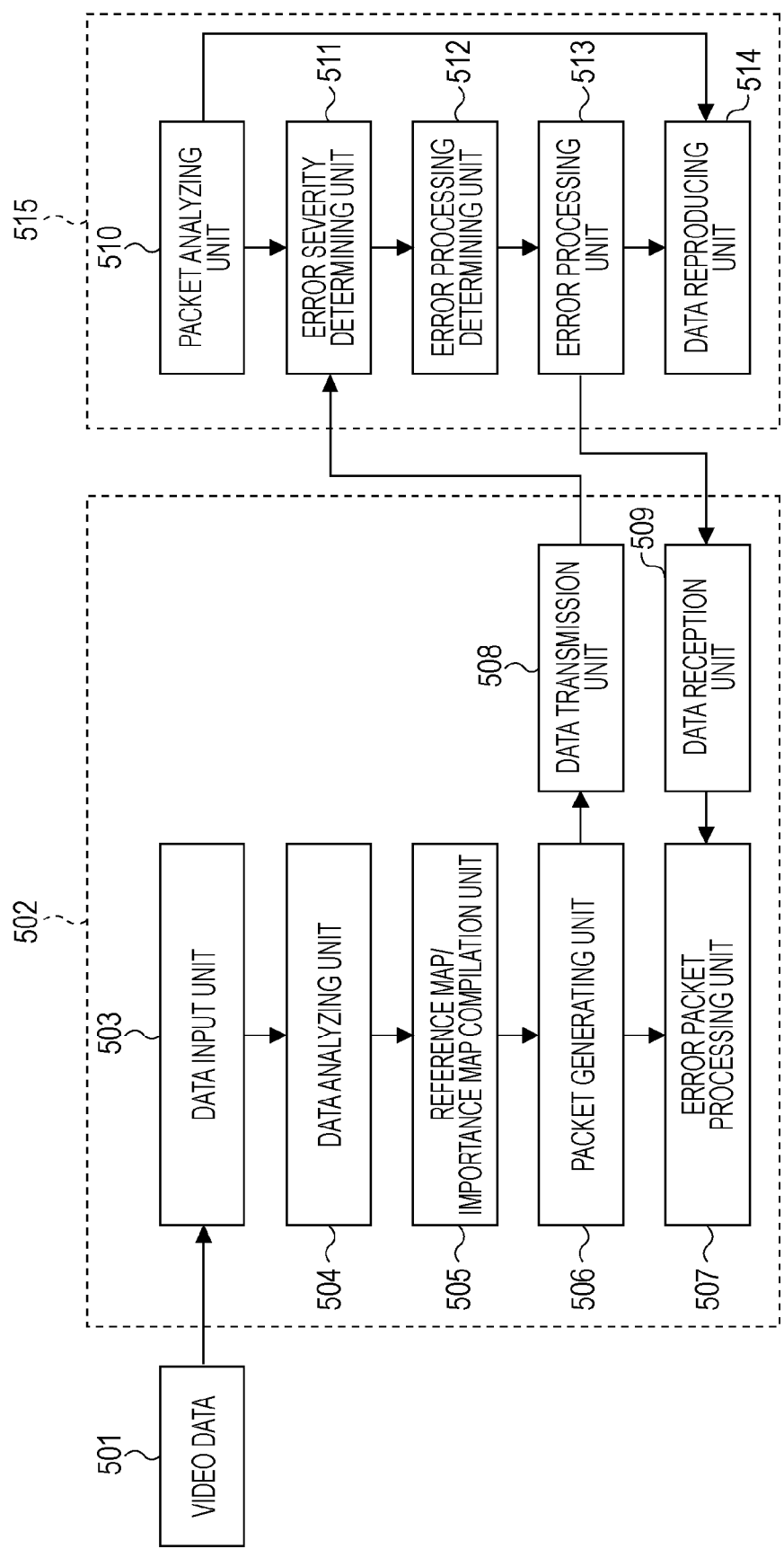
FIG. 5 is a diagram illustrating an exemplary functional configuration of an image receiving apparatus and server according to a fourth embodiment of the present invention.

FIG. 5 is a block diagram showing a functional configuration example of a server and video receiving apparatus with the present embodiment.

The transmitter (server) 502 has a reference map/importance map compilation unit 505 which includes information or the like to reference the frame, such as numbers of the frames which make up the packet.

First, a data analyzing unit 504 analyzes the video data 501 inputted with a data compilation unit 503. Next, the reference map/importance map compilation unit 505 creates a reference map and importance map of the video data 501 according to the analysis from data analyzing unit 504. The reference map here shows a menu such as frame reference information or packet configuration information in the case the video data 501 is divided into packets. Also, an importance map shows a menu of importance of each packet in which the video data 501 is divided into multiple pieces. The created reference map is sent to the video receiving apparatus 515 from the data transmitting unit 508. Also, the importance map is also similarly sent to the video receiving apparatus 515 from the data transmitting unit 508.

The packet generating unit 506 divides the input video data 501 into packet units, and sends this to the video receiving apparatus 515 via a data transmitting unit 508. Also, the data receiving unit 509 receives the retransmission request from the video receiving apparatus 515, and the error packet processing unit 507 reproduces the packet, according to a retransmission request received.

With the above-described first embodiment, based on the received packet and the information added to the packet and the information relating to the packet, processing is performed to detect a packet with an error having occurred, and determine the importance of the packet. On the other hand, with the present embodiment, the video receiving apparatus 515 performs detecting of a packet with an error having occurred and determining the importance thereof based on the reference map and importance map sent from the server 502.

Specifically, with the present embodiment, determination is made using the reference map, so the load of performing detecting of a packet with an error having occurred is reduced. Also, similar to the reference map, an importance map is also sent, which has recorded therein the importance of a packet based on the importance determining elements of each packet, whereby the load to determine importance is reduced.

The packet analyzing unit 510 detects a packet with error having occurred based on the reference map. An error severity determining unit 511 obtains the importance of such packet from the importance map sent from the server 502, based on the packet number including the error obtained with the packet analyzing unit 510. The error processing determining unit 512 determines an error processing method based on the determining result with the error severity determining unit 511. Based on the error processing method determined in the error processing determining unit 512, the error processing unit 513 performs error processing (instructions necessary for error processing). At this time, in a case of performing a retransmission request and so forth, instructions are given to the server 502. The data subjected to error processing is finally displayed on a display apparatus with the data reproducing unit 514. Note that the importance map created on the server 502 side, information relating to a specified packet importance determining element, or importance information summing multiple importance determining elements, may be used. Also, frame reference information and packet configuration information is exemplified as information recorded in a reference map, but should not be limited to the above examples.

As shown with the present embodiment, analysis of the data to be transmitted is performed in the server 502 side, and the reference map and importance map are created and sent to the video receiving apparatus 515 side. The results of analysis of all packets are recorded on the reference map, so the video receiving apparatus 515 can obtain information added to packet more certainly, and further, the load of packet analysis processing is reduced at the video receiving apparatus 515 side.

Other Embodiments

The various components configuring a video receiving apparatus and the various processes of control methods for the video receiving apparatus according to the embodiments of the present invention as described above can be realized by running a program stored in RAM or ROM of a computer. The program and a computer-readable recording medium (storage medium) wherein the program is recorded (stored) are encompassed within the scope of the present invention.

Also, the present invention can have embodiments such as systems, apparatuses, methods, programs, or recording media (storage media), and specifically, may use a system made up of multiple apparatuses, or may be a stand-alone apparatus.

Figure 7:
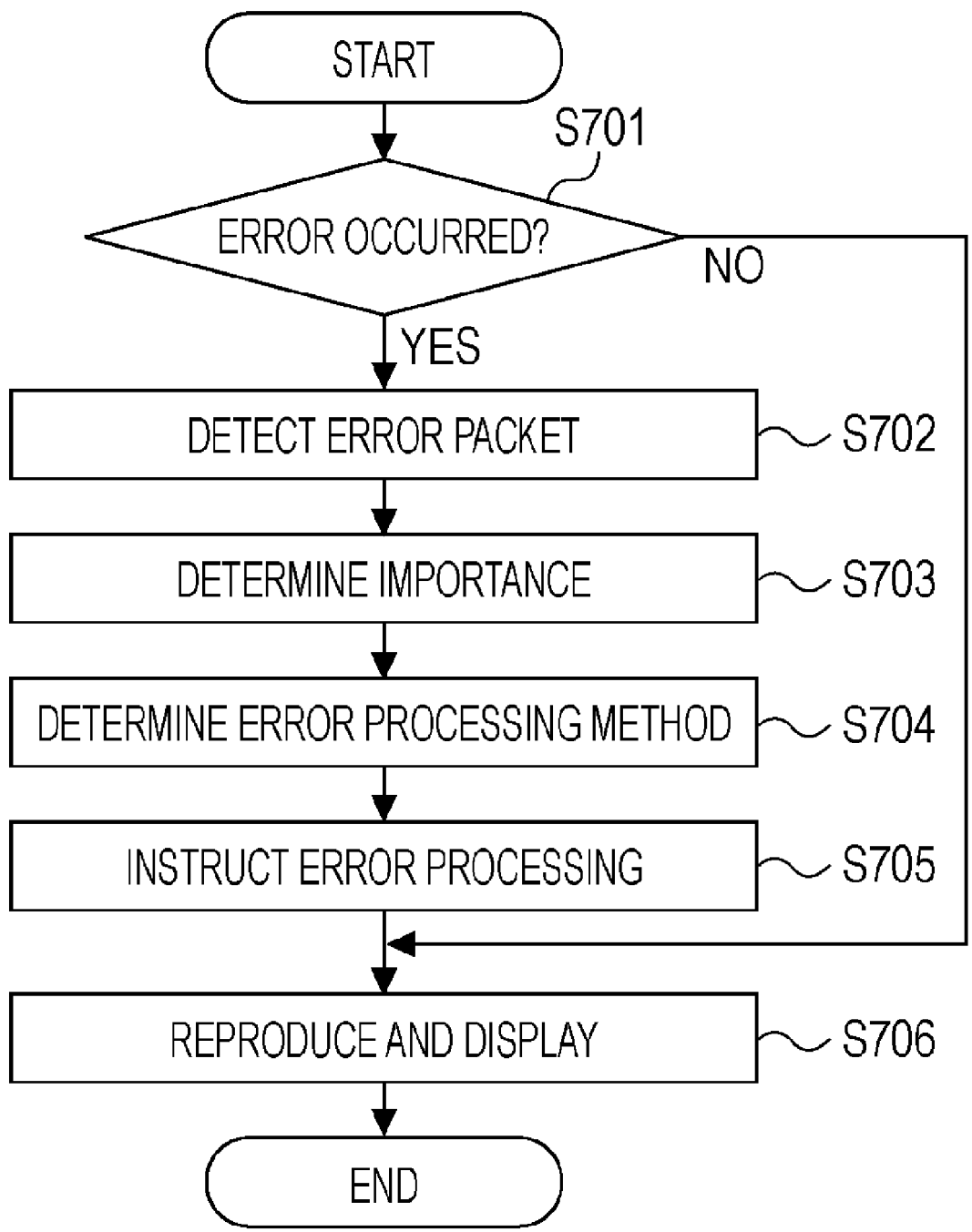
FIG. 7 is a flowchart illustrating an example of a processing sequence with the image receiving apparatus according to the first embodiment of the present invention.

Note that the present invention includes cases where a software program (in the embodiments, a program corresponding to the flowchart shown in FIG. 7) to realize the functions of the embodiments described above is supplied directly to the system or apparatus, or remotely. A case is included wherein the computer of the system or apparatus thereof reads and executes the supplied program code.

Accordingly, in order to realize the function processing of the present invention with a computer, the program code installed in the computer also realizes the present invention. That is to say, the present invention also includes the computer program itself to realize the functional processing of the present invention.

In such a case, object code, programs executed with an interpreter, script data supplied to an operating system (OS), and so forth may be used, so long as having the functions of a program.

The recording medium (storage medium) to supply the program, for example may be a flexible disk, hard disk, optical disc, magneto-optical disk, and so forth, including, for example, MO, CD-ROM, RD-R, CD-RW, magnetic tape, non-volatile memory card, ROM, DVD (DVD-ROM, DVD-R), and so forth.

As another program supply method, there is a method to connect to an Internet home page using a browser of a client computer. The computer program of the present invention itself, or a file which is compressed and includes a self-installing function, can be supplied by downloading to the recording medium (storage medium) such as a hard disk.

Also, the program code configuring the program of the present invention can be divided into multiple files, and these files can be downloaded from different home pages. That is to say, a WWW server from which multiple users download a program file for realizing the functional processing of the present invention is also included in the present invention.

Also, as another method, the program of the present invention can be encrypted and stored in a storage medium such as a CD-ROM and distributed to users, and allow users who have cleared predetermined conditions to download the key information to solve the encryption from the home page via the Internet. By using the key information, an encrypted program can be realized by executing the program upon installation in a computer.

Also, the computer executes the read out program, whereby the above-described embodiment functions are realized. Further, based on the instructions of the program, the OS operating on a computer can perform part or all of the actual processing, whereby the functions of the above-described embodiments can be realized.

Further, as another method, the program read out from the recording medium (storage medium) is written into memory associated with a function expansion unit which is connected to the computer or a function expansion board inserted in the computer. Based on the program instructions, a CPU or the like associated with the function expansion board or function expansion unit can perform part or all of the actual processing, and the functions of the above-described embodiments can be realized by the processing thereof.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2007-160222 filed Jun. 18, 2007, which is hereby incorporated by reference herein in its entirety.

What is claimed is:

1. A video receiving apparatus to receive packetized video data from a server, the video receiving apparatus comprising:
    a detecting unit configured to detect an error from the packetized video data received from the server;
    a first determining unit configured to determine importance of the packetized video data based on added information relating to the packetized video data;
    a second determining unit configured to determine an error process of the packetized video data, according to the importance determined by the first determining unit; and
    an error processing unit configured to process the packetized video data with the error, according to the error process determined by the first determining unit;
    wherein the second determining unit determines that a re-transmission request of the packetized video data is to be transmitted to the server in a case where the first determining unit determines that the importance of the packetized video data is a first importance, and the second determining unit determines that concealment processing of the error is to be performed in the video receiving apparatus without transmitting the re-transmission request of the packetized video data to the server in a case where the first determining unit determines that the importance of the packetized video data is a second importance which is less important than the first importance.

2. The video receiving apparatus according to claim 1, wherein the determining unit obtains an error propagating distance showing how far the error occurring in the packetized video data is propagated to following packetized video data, from the added information relating to the packetized video data, and determines the importance of the packetized video data with the error, according to the obtained error propagating distance.

3. The video receiving apparatus according to claim 1, wherein the determining unit computes the importance of the packetized video data with error while referencing importance of multiple items of the added information relating to said video data, and determines the computed importance.

4. The video receiving apparatus according to claim 3, wherein the determining unit determines the importance of a plurality of items of added information relating to the packetized video data based on set threshold information, and computes the importance of the packetized video data with the error while referencing the determined importance.

5. The video receiving apparatus according to claim 1, wherein the detecting unit detects the error from the packetized video data while referencing a reference map including reference information of a frame received from the server and packet configuration information.

6. The video receiving apparatus according to claim 1, wherein the determining unit determines the importance of the packetized video data with the error, based on an importance map with the importance of the packetized video data received from the server recorded therein.

7. The video receiving apparatus according to claim 1, wherein the determining unit computes the importance of the packetized video data while referencing the importance of at least one item of a plurality of items of the added information relating to the packetized video data, and determines the computed importance.

8. A control method of a video receiving apparatus arranged to receive packetized video data from a server, the method comprising:
    detecting an error from the packetized video data received from the server;

determining importance of the packetized video data with the error in the case that the error is detected, based on added information relating to the packetized video data;
determining an error process of the packetized video data, according to the importance; and
processing the packetized video data with the error according to the error process;
wherein determining the error process comprises determining that a re-transmission request of the packetized video data is to be transmitted to the server in a case where the determining that the importance of the packetized video data is a first importance, and the determining that concealment processing of the error is to be performed in the video receiving apparatus without transmitting the re-transmission request of the packetized video data to the server in a case where the importance of the packetized video data is a second importance which is less important than the first importance.

9. A non-transitory computer readable medium storing a program that, when executed by a processor, causes the processor to perform operations of receiving packetized video data from a server, the operations comprising:

detecting an error from the packetized video data received from the server;
determining importance of the packetized video data with the error in the case that the error is detected, based on added information relating to the packetized video data;
determining an error process of the packetized video data, according to the importance; and
processing the packet with the error, according to the error process;
wherein determining the error process comprises determining that a re-transmission request of the packetized video data is to be transmitted to the server in a case where the determining that the importance of the packetized video data is a first importance, and the determining that concealment processing of the error is to be performed in the video receiving apparatus without transmitting the re-transmission request of the packetized video data to the server in a case where the importance of the packetized video data is a second importance which is less important than the first importance.

* * * * *